Jan. 10, 1939.   A. A. FRINK   2,143,372
FAN STOP
Filed Nov. 18, 1936
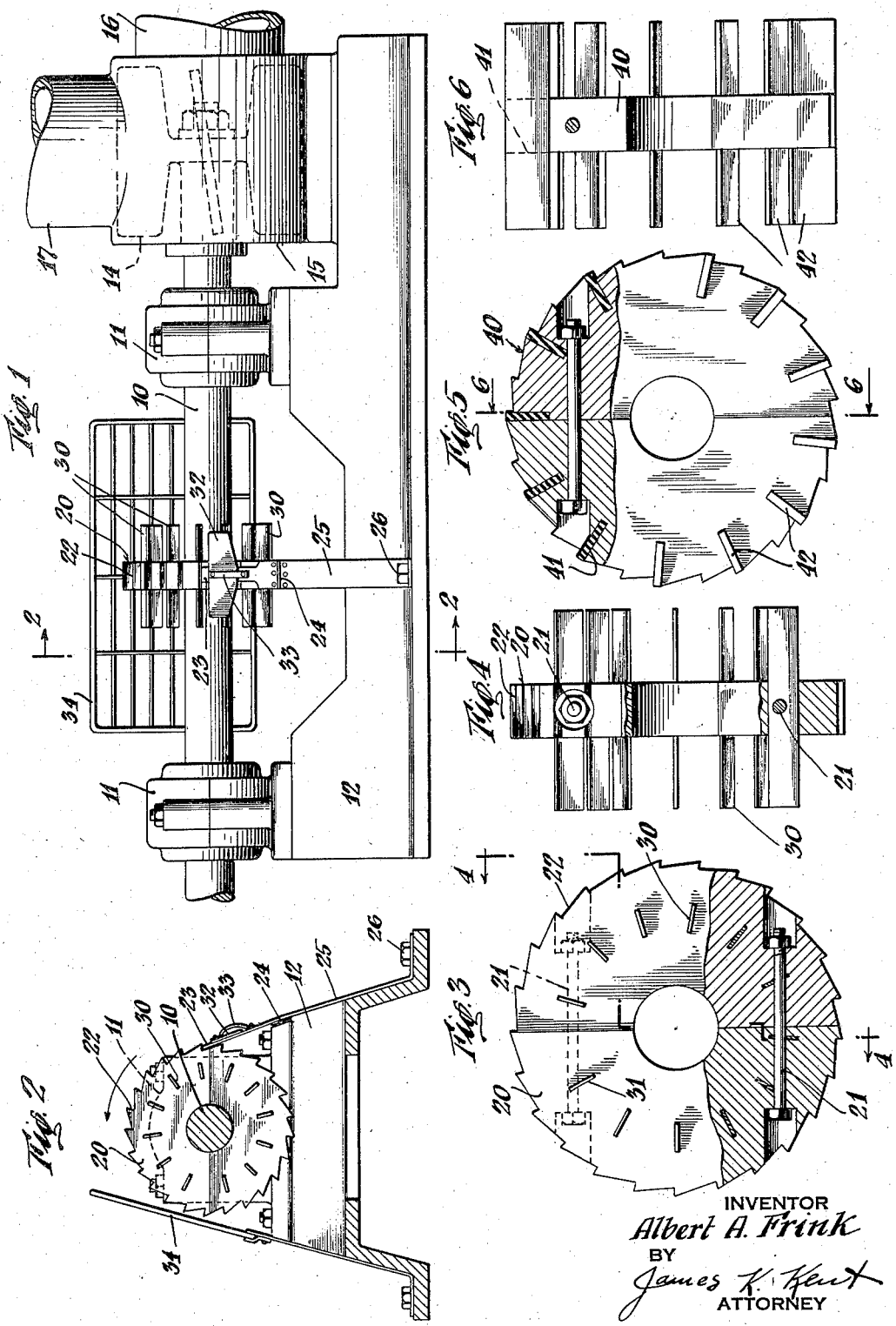
INVENTOR
Albert A. Frink
BY
James K. Kent
ATTORNEY Patented Jan. 10, 1939

2,143,372

UNITED STATES PATENT OFFICE 2,143,372

FAN STOP

Albert A. Frink, Chihuahua, Mexico, assignor to American Smelting and Refining Company, New York, N. Y., a corporation of New Jersey Application November 18, 1936, Serial No. 111,425

3 Claims. (Cl. 230—132)

This invention relates to a stop or holdback for fan shafts and the like for preventing rotation thereof in the reverse direction when power is shut off or interrupted.

The invention is of particular importance in conjunction with baghouse fans and the like which are periodically shut down to permit removal of material collected by the bags. When this occurs the reverse air current through the fan tends to cause the fan to drift in the reverse direction. Upon application of power for starting up the fan, it is then necessary to overcome the reverse momentum and bring the fan to rest before starting its normal rotation. This results in the waste of a substantial amount of power and also produces a torque which may damage the motor, starting box mechanism, bearings, etc.

The present invention overcomes the above difficulties by providing a novel stop which engages a ratchet on the fan shaft when the fan comes to rest and locks the same against movement in the reverse direction. A means is also provided to hold the stop disengaged when the fan is operating normally.

The invention also consists in the various details of construction and combinations of parts hereinafter more fully set forth and claimed.

Although the novel features which are believed to be characteristic of this invention will be more particularly pointed out in the claims appended hereto, the broader aspects of the invention will be better understood by referring to the following description, taken in connection with the accompanying drawing, in which one embodiment thereof has been set forth for purposes of illustration.

In the drawing:

Fig. 1 is a side elevation of a fan, shaft and associated mechanism illustrating one embodiment of the present invention;

Fig. 2 is a section taken on the line 2—2 of Fig. 1;

Fig. 3 is a detail view of the ratchet wheel forming part of the stop mechanism;

Fig. 4 is a section taken along the line 4—4 of Fig. 3;

Fig. 5 is a detail view of a modified form of ratchet wheel; and

Fig. 6 is a section taken along the line 6—6 of Fig. 5.

Referring to the drawing more in detail, the invention is shown as applied to a shaft 10 which is mounted in suitable bearings in a pair of housings 11 supported on a base 12. The shaft 10 drives a fan 14 mounted in a housing 15 and adapted to draw air from a duct 16 and to discharge the same into a duct 17. The fan 14 and ducts 16 and 17 may be of the type commonly employed in connection with a bag-house or the like for use in removing suspended particles from gases. It is to be understood that any suitable type of fan may be employed and that the invention is particularly applicable to a fan which is capable of reversing in response to a reverse draft through the ducts 16 and 17, such as may occur when the fan is shut down. These ducts constitute a flue.

The stop mechanism, in accordance with the present invention, comprises a ratchet wheel 20 which is shown in Figs. 3 and 4 as formed of wood in two sections which are held together by bolts 21 and is clamped about the shaft 10. The ratchet wheel 20 is provided with a plurality of teeth 22 which are engaged by a pawl 23 to prevent rotation of the wheel in one direction, for example, in a clockwise direction while permitting free rotation thereof in the opposite direction. The pawl 23 is mounted by a hinge 24 on a bracket 25 which is supported on the base 12 by a bolt 26. The bracket 25 and pawl 23 are positioned on an incline so that the pawl is held by gravity against the teeth 22. The hinge 24 may include a stop (not shown) to prevent the pawl from being raised past the vertical position.

In order to release the pawl when the shaft 10 is operating normally, a plurality of vanes 30 are provided. These vanes 30 may comprise metal strips which are passed through suitable slots 31 in the ratchet wheel 20 and extend on opposite sides thereof a distance adapted to produce an air current for the purpose to be described. A wing 32 is mounted on the pawl 23 and is held by a spring clip 33 thereon. This wing 32 extends on opposite sides of the pawl 23 into a position to intercept the air current produced by the vanes 30 when the shaft 10 is rotated. The air current thus produced causes the pawl 23 to be disengaged from the teeth 22 when the shaft 10 is rotating at normal speed. When the shaft comes to rest, however, the air current is interrupted thereby permitting the pawl 23 to fall against the ratchet wheel 20 and to securely lock the same and the shaft 10 against reverse rotation. A shield 34 may be mounted on the base 12 in front of the ratchet wheel 20 for safety purposes. This shield is preferably of open construction so as not to interfere with the production of an air current by the vanes 30.

While the ratchet wheel 20 has been shown and described as formed of wood, it is obvious that it may be made of any other suitable material such as a molded composition or metal and may be keyed or otherwise secured on the shaft 10 according to the requirements of the particular case. It is also to be understood that the vanes 30 may be secured to the ratchet wheel in any convenient way as by bolts or by welding. In certain instances the vanes may be mounted only on one side of the ratchet wheel.

A modified form of ratchet wheel is shown in Figs. 5 and 6. In this embodiment the ratchet wheel 40 is similar in construction to the ratchet wheel 20 above described. It is provided, however, with a plurality of slots 41 arranged at the periphery thereof. A set of vanes 42 of flexible material, such as rubber or the like are held in these slots 41. The operation of this embodiment is similar to that above described. The flexible vanes 42, however, reduce the possibility of injury by the device and produce a smooth and uniform operation.

It is evident that the vanes and wheels may be made of any suitable materials and may be assembled in any convenient manner. Although a particular embodiment of the invention has been shown and described for purposes of illustration, various changes and modifications may be made by those skilled in the art within the scope of the invention.

What is claimed is:

1. In combination, a fan having a drive shaft, stop mechanism for preventing reverse rotation thereof comprising a toothed member mounted on said shaft, a pawl mounted to engage said member to lock the same against reverse rotation, vanes mounted on said toothed member to produce a current of air when said member is rotating normally and means associated with said pawl and actuated in response to said current of air to hold said pawl out of engagement with said toothed member.

2. In combination, a fan having a drive shaft, stop mechanism for preventing reverse rotation thereof comprising a toothed member mounted on said shaft, a pawl mounted to engage said member to lock the same against reverse rotation, vanes extending on opposite sides of said toothed member to produce a current of air when said member is operating normally and wings mounted on said pawl and responsive to said current of air to hold said pawl out of engagement with said toothed member.

3. The combination comprising a flue, a drive shaft having a fan and a ratchet wheel mounted thereon, said fan being mounted internally of said flue and said ratchet wheel being mounted externally thereof, a pawl adapted to engage said ratchet wheel and permit rotation of said shaft in one direction only, means responsive to rotation of the shaft in that direction producing a current of air, and means associated with said pawl intercepting said air current sufficiently to drive said pawl out of engagement with said ratchet wheel and maintain such disengagement while said shaft is normally rotating.

ALBERT A. FRINK.